(12) United States Patent
Chapon et al.

(10) Patent No.: US 7,322,167 B2
(45) Date of Patent: *Jan. 29, 2008

(54) LOADING ARRANGEMENT FOR A WRAPPING MATERIAL ROLL

(75) Inventors: Emmanuel Chapon, Champvans (FR); Jean Viaud, Gray (FR); Fabien Chapron, Suippes (FR)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/370,819

(22) Filed: Mar. 8, 2006

(65) Prior Publication Data

US 2006/0243393 A1    Nov. 2, 2006

(30) Foreign Application Priority Data

Apr. 2, 2005   (DE) .................... 10 2005 015 223

(51) Int. Cl.
  *B65B 41/12*  (2006.01)
  *B65B 11/56*  (2006.01)
  *A01F 15/07*  (2006.01)
(52) U.S. Cl. .................... 53/389.2; 53/118; 53/587
(58) Field of Classification Search ............... 53/118, 53/211, 587, 389.2, 389.4; 242/558, 559, 242/559.1, 561, 564.5
See application file for complete search history.

(56) References Cited

U.S. PATENT DOCUMENTS

| 4,569,439 | A | | 2/1986 | Freye et al. |
| 4,956,960 | A | | 9/1990 | Anstey et al. |
| 5,433,059 | A | * | 7/1995 | Kluver et al. ................ 53/118 |
| 5,974,764 | A | * | 11/1999 | Anstey et al. ............... 53/118 |
| 5,979,141 | A | * | 11/1999 | Phillips ..................... 53/389.2 |
| 6,029,420 | A | * | 2/2000 | Tertilt et al. ................ 53/118 |
| 6,272,816 | B1 | * | 8/2001 | Viaud et al. ................ 53/587 |
| 7,237,372 | B2 | * | 7/2007 | Chapon et al. ........... 53/389.2 |
| 2006/0218878 | A1 | * | 10/2006 | Chapon et al. ........... 53/389.2 |

FOREIGN PATENT DOCUMENTS

EP   1 099 366   11/2000
EP   1 602 269   6/2005

OTHER PUBLICATIONS

European Search Report, Jul. 18, 2006, 5 Pages.

* cited by examiner

*Primary Examiner*—Stephen F. Gerrity

(57) ABSTRACT

A loading arrangement of a wrapping arrangement in which a wrapping material roll deposited on a carrier can be moved into an operating position, where it is held in place by a roll. The roll is brought into an operating position by an actuator as a result of the carrier being moved out of its loading position.

8 Claims, 5 Drawing Sheets

LOADING ARRANGEMENT FOR A WRAPPING MATERIAL ROLL

BACKGROUND

Field of the Invention

The invention concerns a loading arrangement, in particular for a wrapping material roll of a rotobaler.

Several arrangements are known in the state of the art with which a wrapping material roll can be inserted into a wrapping arrangement, for example, of a rotobaler. For example, EP 1 099 366 shows a loading arrangement in which a wrapping material roll can be deposited on a carrier and brought with it into an operating position.

The problem underlying the invention is seen in the fact that further manual operating steps are required after the insertion of the wrapping material roll until the wrapping arrangement is ready for operation.

SUMMARY

Since the wrapping arrangement of the present invention includes a carrier to take up the wrapping material roll and can be moved between a loading position and an operating position, an actuator is brought into its operating condition that is appropriate to bring the wrapping arrangement into a position in which wrapping material can be removed from the wrapping material roll during a wrapping operation, and includes devices that activate the actuator as a function of the position of the carrier. This advantage simplifies the operation, provides assurance that the loading arrangement is ready for operation when the carrier is folded upwards, and saves time. The position of the carrier can be transmitted to the actuator mechanically, as well as electrically or hydraulically, among other possibilities by switches or mechanical followers. While carriers that are easily and simply accessible can be pivoted mechanically, that is, by hand, between their positions, it is advantageous if carriers of great weight and/or poor accessibility can be shifted by means of motors.

If the actuator is configured as a spring, particularly a gas spring, this can be tensioned and, if necessary, its tension released by an operator or by a movement derived from the machine to which the loading arrangement is attached. On the other hand, the actuator can also be configured as a motor that can be activated in one or both directions. Preferably, the actuator is configured and arranged in such a way that it is tensioned by a pulling movement applied by an operator to the carrier so that the operator is protected against any bodily harm.

The provision of a wall to position the wrapping material roll during the operation provides assurance that this move does not roll past the operating position due to its inertia during the loading and then must again be properly positioned with difficulty. Such a wall can also protect the area of the course of the wrapping material against an accumulation of harvested crop and thereby maintain the reliability of the wrapping arrangement altogether at a high level.

In order to put a wrapping arrangement into an operating position, it is useful to provide rolls that secure the position of the wrapping material roll and that can be moved, for example, by means of one or more arms or contact pressure arms relative to the wrapping material roll. Here, the one or more rolls can be arranged to be braked or driven or rotate freely and the arms, in the simplest case, are preferably configured as a linkage, a steering arm, a rope pull or the like that are engaged in bearings. Regardless of the above electrically or hydraulically positioned rolls can be provided. The actuating arrangement here provides or at least supports the movement of the roll.

The use of a connection of a slot and a pin, peg, screw, axle or the like guided in it, permits the movement of the carrier to be used for the control of the actuator only after a certain path has been covered. As long as the contact pressure arm can be held in a non-operating position despite the movement of the carrier, it is possible to insert or remove a wrapping material roll.

Since the torques developed on the basis of a pivoting movement about an axis are greater the larger the lever arms, it is useful to apply a driver, particularly if it is partially independent of the movement of the contact pressure arm and can develop a larger lever arm more rapidly on the basis of its free movement than would be possible with the direct connection of the actuator to the contact pressure arm. The loose connection via the driver also makes it possible that the contact pressure arm or the driver can still move when the other component in each case can no longer move.

The mounting of the actuator on a bearing whose position before the carrier can be controlled makes it possible to vary the effect of the actuator during the movement and on the basis of the movement of the carrier and thereby to make it conform to the immediate requirements.

Particularly when external forces are applied to the carrier, it is advantageous if it can be secured in at least one end position, for example, for the protection of an operator. A locking bar provided for this purpose can be configured mechanically and/or preloaded in one or both directions or it could be moved by means of external forces. In order that the locking bar that may be provided can be moved by an operator together with the carrier, a locking bar actuating arrangement is useful which is located at a position at which an operator could also grasp the carrier.

BRIEF DESCRIPTION OF THE DRAWINGS

The drawings show an embodiment of the invention that shall be described in greater detail in the following.

DETAILED DESCRIPTION OF THE INVENTION

Figure 1:
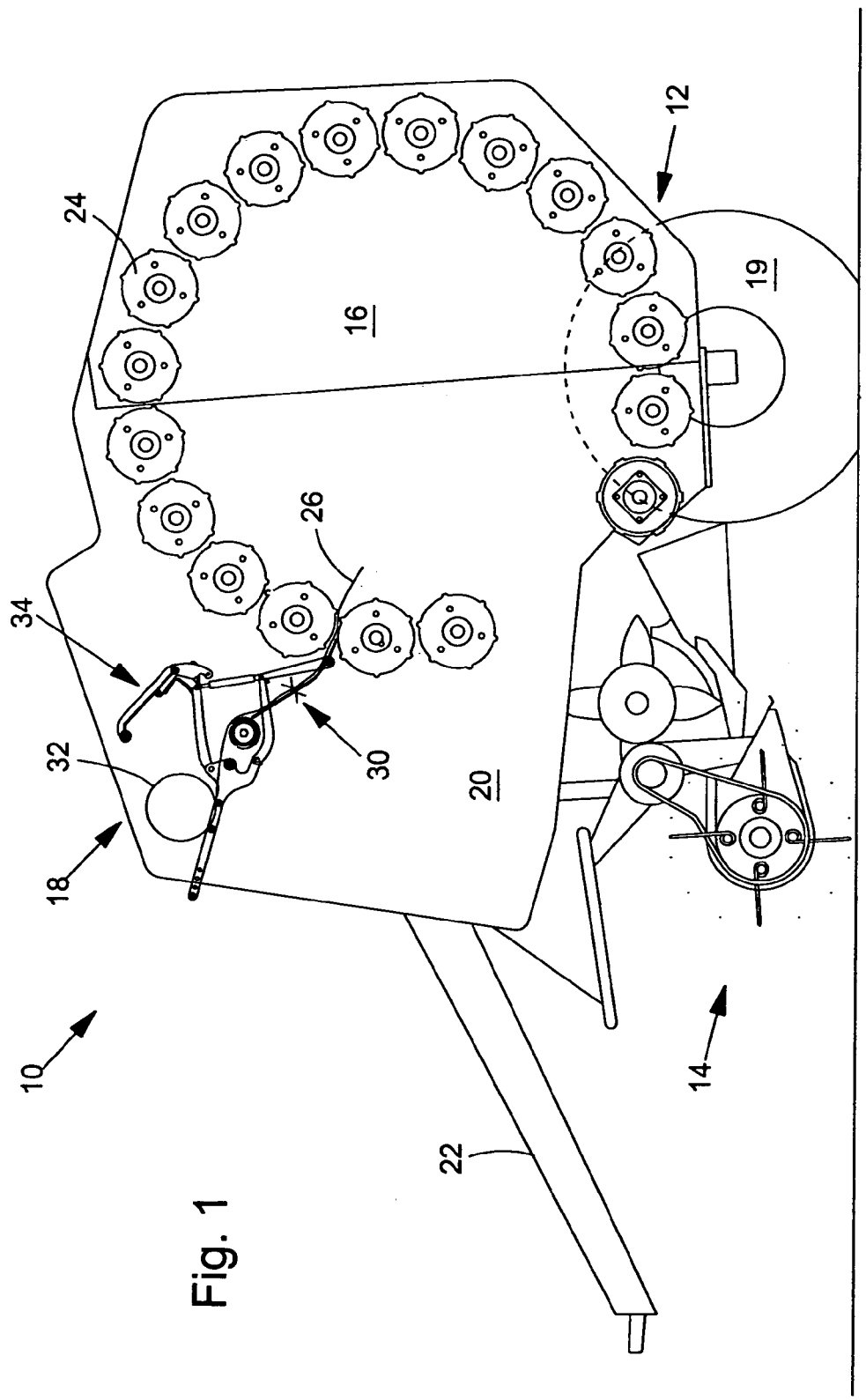
FIG. 1 shows a rotobaler with a wrapping arrangement embodying the principles of the present invention.

A rotobaler embodying the principles of the present invention is generally illustrated in FIG. 1 designated at 10. As some of its main components the rotobaler 10 includes a running gear 12, a harvested crop supply arrangement 14, a baling chamber 16 and a wrapping arrangement 18.

Here the rotobaler 10 represents a baler that delivers a baled product that can be wrapped with a wrapping material. Accordingly, this may be a baler that can be applied in agriculture or in industrial applications with which harvested crop, garbage, paper, cloth, cotton, tobacco, etc. can be formed, in particular, into cylindrical bales. The configuration of a fixed baling chamber baler is also shown only as an example and may be configured as a rotobaler 10 with a baling chamber 16 of variable size or in a mixed configuration. Fundamentally the wrapping arrangement 18 could be applied in any situation in which an object is to be covered with a wrapping material that is withdrawn from a roll, that is, independent of the presence of a baler.

The running gear 12 is provided in a manner not shown in any further detail with a frame and an axle with wheels 19, to which side walls 20 and a towbar 22 are attached, as this is commonly constructed. The towbar 22 extends approximately in a generally horizontal direction from the forward end region of the running gear 12 to a towing vehicle, not shown.

The harvested crop supply arrangement 14 is representative of any arrangement with which crop to be baled is fed into the baling chamber 16. The harvested crop supply arrangement 14 is generally located underneath the towbar 22.

The baling chamber 16 extends between the two side walls 20 and is surrounded, in this case, by rolls 24 located on a circle which leave an upper gap in the forward region for the wrapping arrangement 18 and a lower gap for the harvested crop supply arrangement 14.

Figure 2:
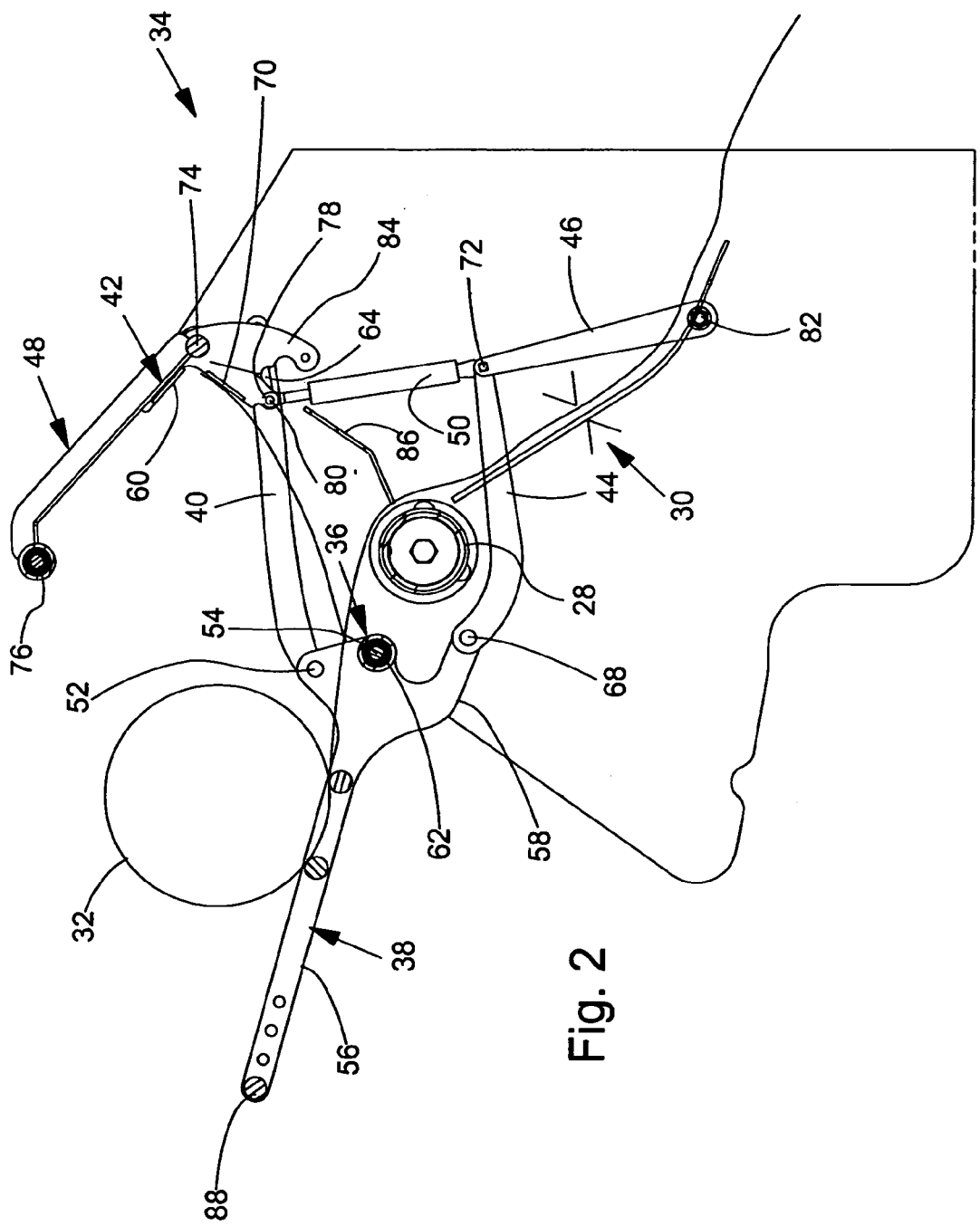
FIG. 2 shows the wrapping arrangement of FIG. 1 in an initial loading condition.

The wrapping arrangement 18 is used to insert wrapping material 26, in the form of foil, net, paper or the like, into the baling chamber 16 and to wrap it around a product of the baler. Various types of wrapping arrangements are known and may be arranged at any desired location of the rotobaler 10. It is advantageous, however, if it is located in such a way that an operator can easily access it. In the present case, the wrapping arrangement 18 is located in the forward region of the running gear 12, above the towbar 22, and is configured in such a way that it delivers the wrapping material 26 through a gap—the upper gap—between two rolls 24 into the baling chamber 16. In the region of the gap, a roll 28 for supplying the wrapping material 26 and a separating arrangement 30 for separating the wrapping material is located. The wrapping material 26 is wrapped around itself forming a wrapping material roll 32. The wrapping arrangement 18 is also associated with a loading arrangement 34, the description of which is provided with reference to FIGS. 2 through 5. Referring now to FIG. 2 seen therein the wrapping arrangement 18 and its loading arrangement 34 are in an initial loading condition, where the following components, in particular, can be recognized: a bearing or pivot shaft 36, a carrier 38, an arm 40, a driver 42, a first steering arm 44, a second steering arm 46, a contact pressure arm 48, an actuator 50 and a support roll 54.

The loading arrangement 34 is constructed and arranged in such a way that a wrapping material roll 32 can be relatively comfortably deposited on the carrier 38 by an operator and brought into an operating position.

The pivot shaft 36 is formed by a through shaft, journal or the like that defines or define an axis of rotation or a pivot axis extending transverse to the direction of operation. The bearing 36 is oriented horizontally and extends parallel to, ahead of and approximately at the same height as the axis of rotation of the roll 28. The pivot shaft 36 is retained in the side walls 20 or in the running gear 12.

The carrier 38 may be constructed of steel or plastic and is sufficiently strong to be able to carry the wrapping material roll 32. Typically, would be formed as a weldment and extend generally between the two side walls 20 or between their imagined extensions, so as to pivot vertically about the pivot shaft 36. The carrier 38 is subdivided into a long support leg 56 and a short connecting leg 58, that together form a one-piece component.

In the loading position, the support leg 56 is inclined towards the connecting leg 58, so that a wrapping material roll 32 deposited on it cannot unintentionally roll off the end of the support leg 56. In the end region of the support leg 56 towards the connecting leg 58, a bearing 52 is provided in a connecting grommet above the support plane defined by the supporting leg 56 of the carrier 38. A bearing 62 is provided in the support plane of the carrier 38 and in its end region toward the pivot shaft 36. The bearing 62 is engaged by the bearing 36 and this permits a vertical pivoting movement of the carrier 38. The connecting leg 58 extends generally parallel to the support leg 56 and is connected to the latter in an arc-shaped connection. A bearing 68 is provided in the free end region of the connecting leg 58. On the basis of the foregoing description three bearings 52, 62 and 68 are located in the end region of the carrier 38 facing towards the pivot shaft 36 and are generally located on or in a line.

The arm 40, generally configured as a straight component, extends generally in the horizontal direction independently of its operating condition. At one end region, shown to the left in FIG. 2, the arm 40 is connected in the bearing 52 with the support leg 56. In its opposing end, to the right of FIG. 2, the arm 40 contains a slot 64 oriented along its longitudinal axis.

The driver 42 is configured as a two-legged angular component that engages a bearing 74 so that it can pivot vertically. A driver plate or a stop 60 is provided on the underside of the driver's upper leg and a driver plate or a stop 70 is provided on the front side of the driver's lower leg, these may be formed by a simple beveled edge of the driver 42. The stops 60, 70, which could alternatively be attached by welding or connected in some other way, are oriented in such a way that they can be brought into contact with and move the contact pressure arm 48. The stops 60, 70 extend at an angle of approximately 90° to each other. A bearing 78 is provided in the free end region of the lower leg of the driver 42 to the upper end of the actuator 50 by means, for example, of a screw, a pin or the like. Preferably, such a driver 42 is provided on each side of the wrapping arrangement 18.

The first steering arm 44 is configured as a slightly bent, flat rolled steel strip that engages at one end with the bearing 68 of the connecting leg 58 and connects at the other end in a joint via a bearing 72 in an end region of the second steering arm 46. As with the driver 42, preferably a steering arm 44 is provided on each side of the wrapping arrangement 18.

The second steering arm 46 is connected at one end in the bearing 72, with the first steering arm 44. At its other end, the second steering arm 46 is supported in a bearing 82, so that it can be pivoted vertically. The bearing 82 is provided in a side wall 20 or in the running gear 12, generally beneath the bearing 74 and considerably to the right of the bearing 68, as seen in FIG. 2. The arrangement of the bearings 68, 72, 82 and the lengths of the steering arms 44, 46 are selected in such a way that, depending on the operating condition, an angle between 90° and 135° generally exists between the two steering arms 44,46.

Figure 4:
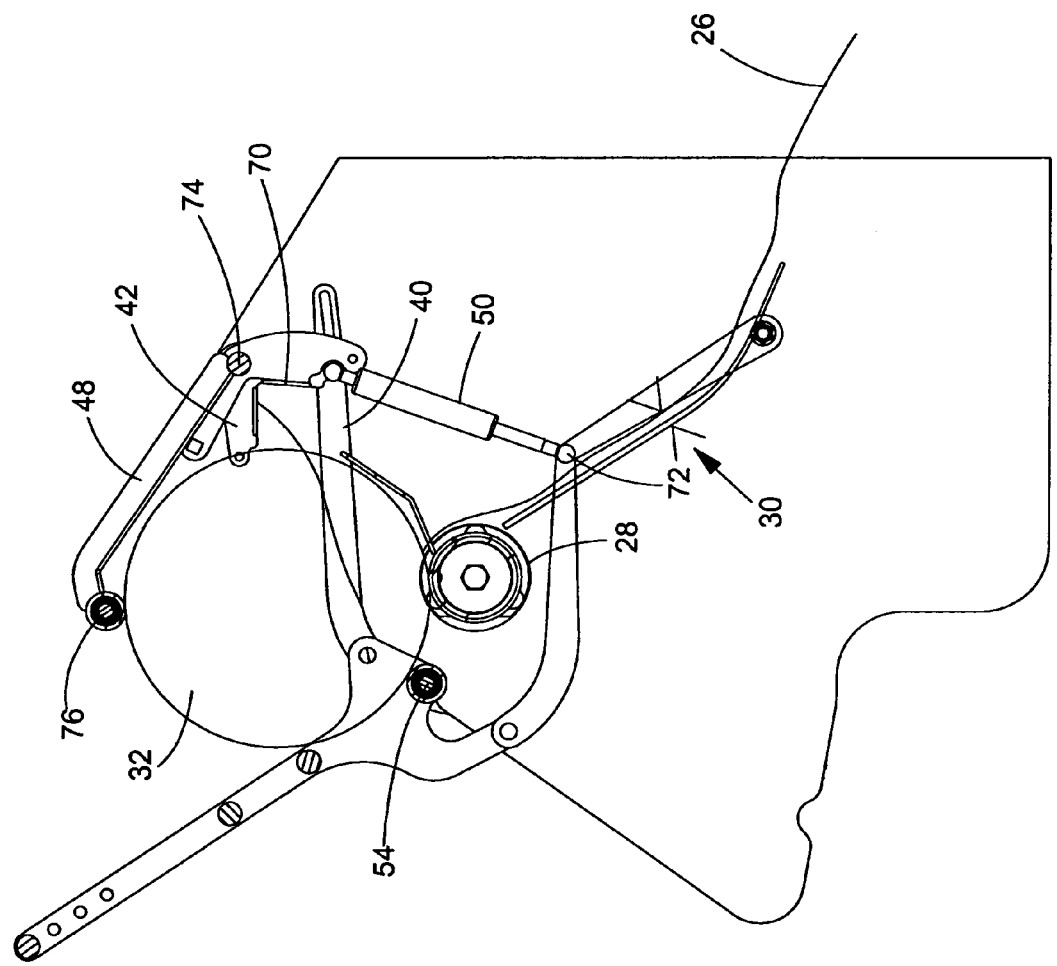
FIG. 4 shows the wrapping arrangement with the wrapping material roll in an operating condition.
Figure 5:
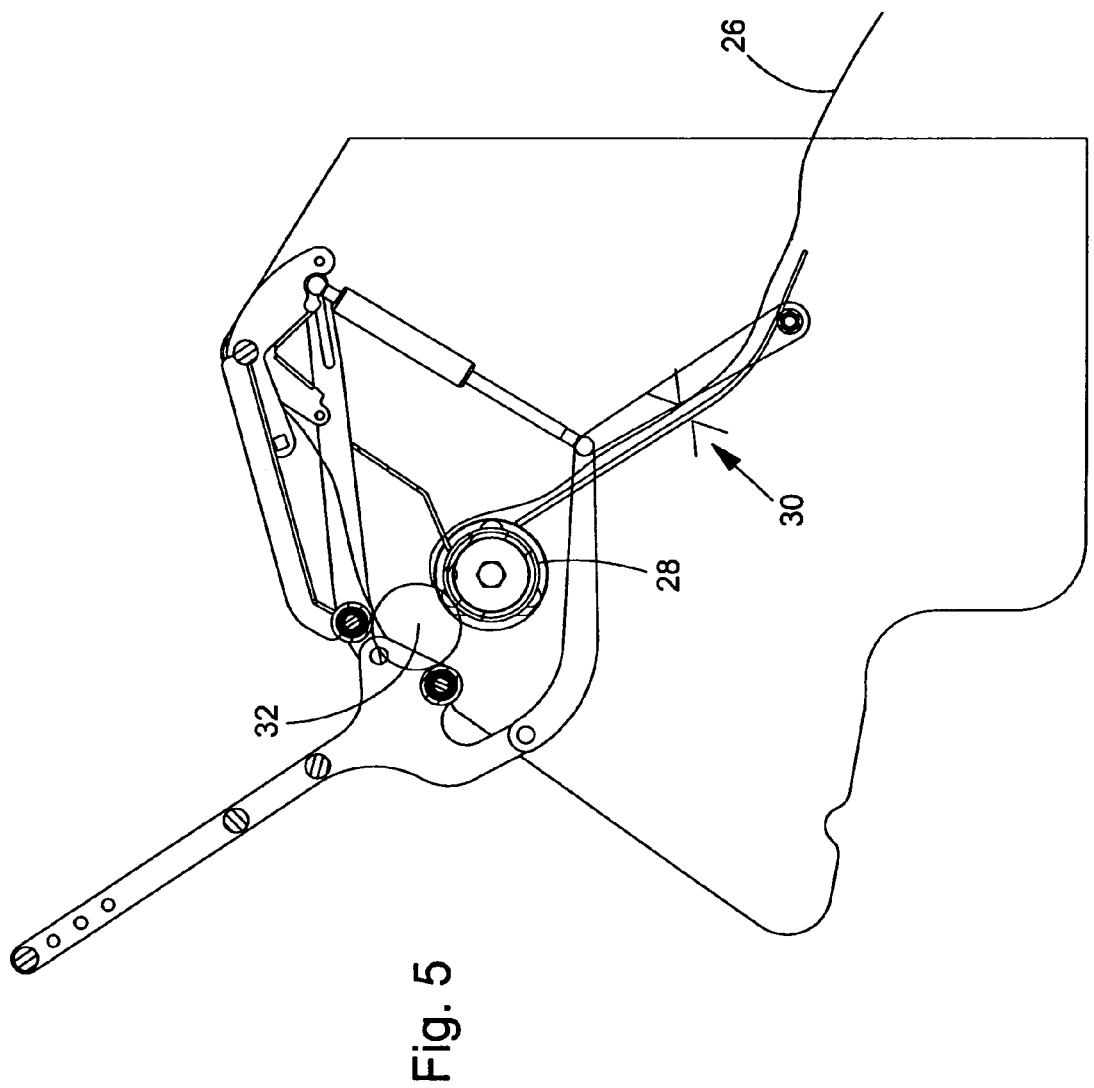
FIG. 5 shows the wrapping arrangement in an operating condition with an almost depleted wrapping material roll.

The contact pressure arm 48 is slightly shorter than the arm 40 and is provided at its end region, the end region away from the bearing 74, with an axle on which a roll 76 is supported in bearings, preferably free to rotate. The roll 76 is oriented parallel to the roll 28 and is arranged in such a way that it can be deposited on the circumferential surface of the wrapping material roll 32 (as seen in FIGS. 4 and 5). An angular lever 84 is provided in an end region of the contact pressure arm 48 located away from the roll 76. The angular lever 84 extends almost at a right angle to the principal extent of the contact pressure arm 48 and intersects with that portion in the region of the bearing 74.

In this embodiment, the actuator 50 is configured as a gas spring; alternatively a mechanical spring, for example, a helical compression spring could be provided, or even a motor, for example, a hydraulic motor or an electric motor. The actuator 50 is connected via its upper end region in the bearing 78 on the driver 42, for which purpose a pin 80 is provided that forms the bearing axis, as well extending through the slot 64 in the arm 40 and being guided in the latter. The actuator 50 is retained with its lower end region in the bearing 72. In every operating condition the actuator 50 extends nearly vertically and biased in a manner to grow longer at all times, that is, to extend. Although the position of the upper, as well as the lower, attaching point changes during the operation, the upper end region of the actuating arrangement 50 performs a generally partial circular movement about the bearing 74. During this partial circular movement, the actuator 50 is compressed to its minimum length, since the position of the lower end region hardly changes, when the bearings 64, 72, 74 come to lie in a straight line. In this previously described position, the actuator 50 becomes ineffective, on each side of the position described, the actuator 50 extends and pivots the driver 42 about the bearing 74.

The support roll 54 is configured in the form of a steel or plastic pipe and extends coaxially to the axis of the pivot shaft 36. The support roll 54 is retained, free to rotate, on the pivot shaft 36 and is appropriate to support the wrapping material roll 32 in conjunction with the roll 28. The support roll 54 may be configured as driven, braked or rotate freely.

Finally a wall 86 is provided that consists of angled sheet metal and is preferably rigidly retained between the two side walls 20. The wall 86 extends at the front and the bottom, close to the roll 28, and one end is inclined upward in the direction of the bearing 74. Thus, the wall 86 forms a trough that can accommodate the wrapping material roll 32 and protect it against harvested crop from below.

From the preceding description there results an operation that shall be described in the following on the basis of FIG. 2.

Figure 3:
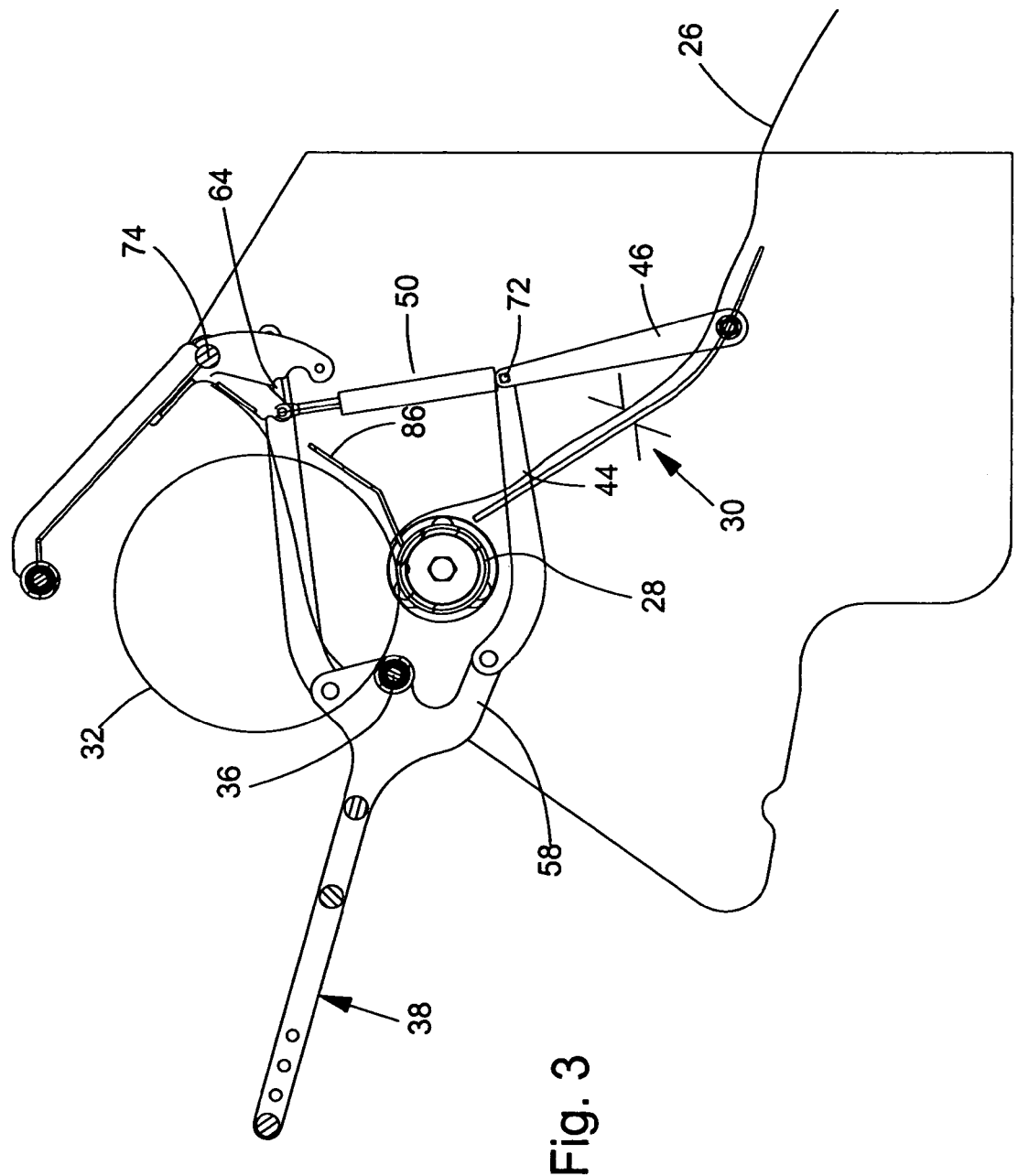
FIG. 3 shows the wrapping arrangement of FIG. 2 with a wrapping material roll in a final loading condition.

FIG. 2 shows the wrapping arrangement 18 in its initial loading condition in which the carrier 38 is folded downward and carries a wrapping material roll 32 and the contact pressure arm 48 is raised up far enough that the wrapping material roll 32 can subsequently (as seen in FIG. 3) be deposited on the roll 28. In this loading condition, the support leg 56 is pivoted downward about the bearing 62 into an almost horizontal position, which has the effect that: a) the arm 40 in FIG. 2 is drawn to the left by the support leg 56 and thereby the pin 80 is brought into contact with the right end of the slot 64; b) on the basis of the connection of the driver 42, the actuator 50 and the arm 40 (by means of the pin 80 in the slot 64), the driver 42 pivots on the bearing 74 in clockwise direction and the actuator 50 is brought from a position to the right of the bearing 74, across a neutral position and to a position on the left of the bearing 74; c) until the stop 60 is brought into contact with the underside of the contact pressure arm 48; d) the actuator 50 is extended and pivots the driver 42 about the bearing 74 in the clockwise direction and, on the basis of the contact of the stop 60 with the contact pressure arm 48, also pivots the latter upward in the clockwise direction; e) the connecting arm 58 forces the first steering arm 44 (in FIG. 2) to the right and thereby pivots the second steering arm 46 in the clockwise direction, so that the bearing 72 is raised slightly.

In this condition, according to FIG. 2, the two steering arms 44, 46 extend approximately at a right angle to each other, this signifies that the bearing 72 is moved towards the driver 42 and, therefore, that the expansion force originating from the actuator 50 is reinforced.

If the wrapping material roll 32 is located on the carrier 38, as is shown in FIG. 2, the carrier 38 is pivoted upward about the pivot shaft 36, so that the wrapping material roll 32 rolls on the roll 28 and the roll 54 where it comes to lie with relative stability. The wall 86 prevents the wrapping material roll 32 from rolling beyond the roll 28 into an erroneous position. Although during this initial movement the arm 40 is shifted towards the bearing 74—but it does not cause a follow-on movement as long as the pin 80 can slide in the slot 64. Thereafter, upward pivoting movement of the carrier 38 has the effect that the connecting leg 58 moves around the pivot shaft 36 and thereby pivots the two steering arms 44, 46. The latter has the effect that the angle between the steering arms increases, the bearing 72 moves further away from the bearing 74, generally to the left in FIG. 4, and the lower end of the actuator 50 moves towards the bearing 36, whereby the inclination of the actuator 50 changes.

FIG. 4 shows the wrapping arrangement 18 in its operating position, in which wrapping material 26 can be withdrawn from the wrapping material roll 32 and introduced into the baling chamber 16. On the basis of the movement of the carrier 36 further upward, the left end of the slot 64, as seen in FIG. 4, will press against the pin 80. This has the effect that the actuator 50 is pivoted in the clockwise direction about the bearing 72 and thereby brings the stop 70 of the driver 42 into contact with the angular lever 84. During the further course of movement of the arm 40, the contact pressure arm 48 will be caused to pivot downward in counterclockwise direction about the bearing 74 and will move towards the wrapping material roll 32, until the roll 76 lies upon it. Simultaneously, the longitudinal axis of the actuator 50 will cross the line through the bearings 72, 74, 78 and thereby force the driver 42 in the counterclockwise direction. Furthermore, the actuator 50 is supported by the bearing 72 which has moved slightly downward and in the direction of the pivot axis 36. As a result, the wrapping material roll 32 is retained at three places between the rolls 54, 28 and 76 and is moved with a certain rolling resistance on the basis of the pressure force of the contact pressure arm 48 so as to assure a taut wrapping material 26 during the wrapping process. As the diameter of the wrapping material roll 32 decreases, the actuator 50 expands and retains the roll 76 in contact with the wrapping material roll 32, as is shown in FIG. 5.

When the wrapping material roll 32 has been consumed or is to be exchanged, the carrier 38 is pivoted downward about the pivot shaft 36, for this purpose a rod or handle 88 can be provided as an alleviation. This pivoting movement has the effect that after a certain free path, the right end of the slot 64, as seen in the drawing, is brought into contact with the pin 80 and thereby pivots the actuator 50 across the line defined through the bearings 72, 74. As soon as the actuator 50 has moved to the left of this line, generally as seen in the drawing of FIG. 2, it expands again and pivots the driver 42 in the clockwise direction about the bearing 74, so that the stop 60 is brought into contact with the underside of the contact pressure arm 48 and finally lifts this arm 48 off the wrapping material roll 32. Finally the situation according to FIG. 2 prevails.

It is therefore intended that the foregoing detailed description be regarded as illustrative rather than limiting, and that it be understood that it is the following claims, including all equivalents, that are intended to define the spirit and scope of this invention.

The invention claimed is:

1. Loading assembly of a wrapping arrangement, of a rotobaler, for a wrapping material roll, comprising:
    a carrier configured to receive a wrapping material roll, the carrier being moveable between a loading position and an operating position;
    an actuator configured to bring the wrapping arrangement into a condition in which wrapping material can be withdrawn from the wrapping material roll during the wrapping operation; and
    devices coupled to the actuator such that that the actuator is activated as a function of the position of the carrier;
wherein the carrier is coupled to a contact pressure arm by means of an arm, the contact pressure arm including a roll and being moveable to a position contacting the wrapping material roll and is loaded directly by the actuator and the actuator is coupled to the contact pressure arm by means of a driver, where an initial free path is provided in both directions between the movement of the driver and that of the contact pressure arm.

2. Loading assembly according to claim 1, wherein the carrier is manually moveable.

3. Loading assembly according to claim 1, wherein the actuator is a spring.

4. Loading assembly according to claim 1, wherein the actuator is a gas spring.

5. Loading assembly according to claim 1, further comprising a wall that is provided and is used to secure the position of the wrapping material roll during the operation.

6. Loading assembly according to claim 1, wherein the arm contains a slot in which a pin is guided that is coupled to the contact pressure arm and to the actuator.

7. Loading assembly according to claim 1 wherein the actuator is coupled to a bearing on a linkage formed by a plurality of steering arms and that the position of the bearing is a function of the position of the carrier.

8. Loading assembly according to claim 1, wherein the carrier is lockable.

\* \* \* \* \*